US007756094B2

(12) United States Patent
Ho (10) Patent No.: US 7,756,094 B2
(45) Date of Patent: Jul. 13, 2010

(54) INTEROPERABLE MOBILE AD HOC NETWORK

(75) Inventor: Long V. Ho, Orange, CA (US)

(73) Assignee: The Boeing Company, Chicago, IL (US)

( * ) Notice: Subject to any disclaimer, the term of this patent is extended or adjusted under 35 U.S.C. 154(b) by 613 days.

(21) Appl. No.: 11/270,956

(22) Filed: Nov. 10, 2005

(65) Prior Publication Data

US 2007/0104160 A1    May 10, 2007

(51) Int. Cl.
*H04W 4/00* (2009.01)
(52) U.S. Cl. .................................................. 370/338
(58) Field of Classification Search ............. 455/435.1, 455/436; 370/254, 498, 436, 338, 412
See application file for complete search history.

(56) References Cited

U.S. PATENT DOCUMENTS

| 5,227,778 | A | * | 7/1993 | Vacon et al. ........... 340/825.52 |
| 6,742,015 | B1 | | 5/2004 | Bowman-Amuah ......... 718/101 |
| 2004/0174822 | A1 | | 9/2004 | Bui ............................ 370/252 |
| 2005/0021713 | A1 | * | 1/2005 | Dugan et al. ................. 709/223 |
| 2005/0083949 | A1 | * | 4/2005 | Dobbins et al. ........ 370/395.53 |
| 2005/0152305 | A1 | * | 7/2005 | Ji et al. ........................ 370/328 |
| 2005/0221814 | A1 | | 10/2005 | Fagan et al. .............. 455/422.1 |
| 2005/0221818 | A1 | | 10/2005 | Johnson et al. ............. 455/431 |
| 2006/0240825 | A1 | * | 10/2006 | Funabiki et al. ............. 455/436 |
| 2007/0070959 | A1 | * | 3/2007 | Almeroth et al. ............ 370/338 |
| 2007/0140302 | A1 | * | 6/2007 | Dworkin et al. ............. 370/498 |
| 2007/0274232 | A1 | * | 11/2007 | Axelsson et al. ............ 370/254 |

\* cited by examiner

*Primary Examiner*—Melody Mehrpour
(74) *Attorney, Agent, or Firm*—Armstrong Teasdale LLP (57) ABSTRACT

Nodes of a network become aware of services provided by the other nodes of the network. A node can store information in a registry that indicates services that the node itself can provide. A node can inform other nodes of services it provides by sending advertisements over the network. Each node can store advertisements from other nodes in a cache. When the node requires a service, it can inspect the registry and the cache to determine where the service can be obtained. If the node cannot find the service listed in the registry and cache, the node can send out a request for the service to the other nodes. A node receiving a request for a service can then check its registry and cache for the service and send a reply with information that allows the requesting node to obtain service from the node that provides the service.

41 Claims, 6 Drawing Sheets

Fig. 6

INTEROPERABLE MOBILE AD HOC NETWORK

FIELD

Embodiments of the present invention relate generally to network systems and, more particularly, to mobile ad hoc network systems.

BACKGROUND

In some environments it is desirable to allow nodes to enter and leave a network as circumstances change. For example, some nodes in the network may be mobile (e.g. an aircraft, satellite, automobile or other vehicle) and may enter or leave the range of wireless communication links between other nodes of the network. Such systems are termed herein as mobile ad hoc networks. When a node first joins a mobile ad hoc network, the other nodes of the network will typically not know the capabilities of the newly joined node. In some systems, the other nodes of the mobile ad hoc network must learn of the newly joined node's capabilities and levels of interoperability before they can use them. Although some shortcomings of conventional systems are discussed, this background information is not intended to identify problems that must be addressed by the claimed subject matter.

SUMMARY

According to aspects of various described embodiments, nodes of a network become aware of services provided by the other nodes of the network. In one aspect, a node can inform the other nodes of the network of a service (or services) it provides by sending advertisements to these other nodes. In one implementation, each node of the network can receive and store advertisements from the other nodes in a datastore (e.g., a cache) and inspect the datastore when it needs a service the node itself does not provide.

In another aspect, a node can store information in a datastore (e.g., a registry) that indicates services (if any) that the node itself can provide. When the node requires a service, it can inspect this datastore before determining whether other nodes in the network can provide the service.

In a related aspect, if the node cannot find the service listed in either its registry or cache, the node can send out a request (e.g., a discovery request) for the service to the other nodes in the network. A node receiving a request for a service can then check its registry and cache for the service, if found, and send a reply with information that allows the requesting node to obtain service from the node that provides the service. If an error occurs because the service information is invalid when obtaining a service, the service entry will be removed from the registry or cache.

In yet another aspect, a node can forward a request for a service to other nodes of the network when the node itself does not provide the service. In one implementation, the request for the service can include information regarding the number of hops that the request is to make. The receiving node can then determine whether to forward the request depending on whether the maximum number of hops has been taken.

In a similar aspect, a node can forward a received advertisement to other nodes in the network. The advertisement can include information regarding the number of hops that the advertisement is to make. The receiving node can then determine whether to forward the advertisement depending on whether the maximum number of hops has been taken.

In still another aspect, entries of received advertisements are deleted after a predetermined duration if the advertisement information has not been updated during that duration.

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
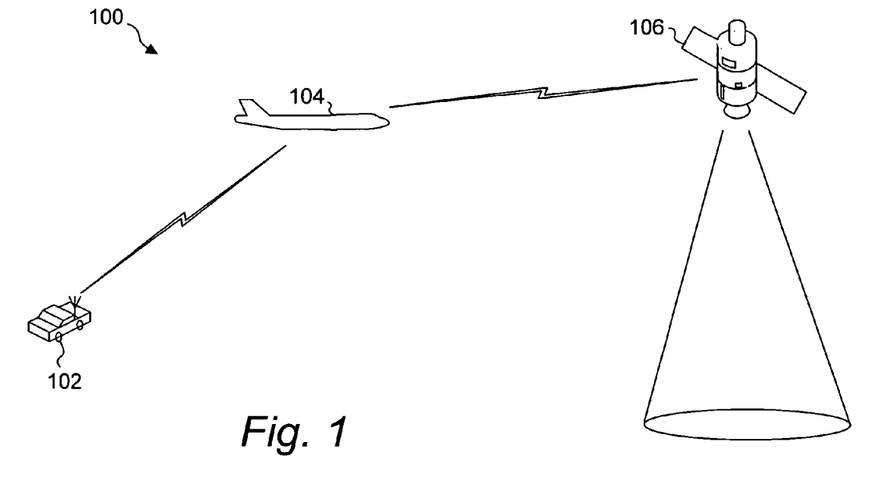
FIG. 1 is a diagram illustrating an exemplary mobile ad hoc network.

FIG. 1 is a diagram illustrating an exemplary mobile ad hoc network 100. In exemplary network 100, nodes such as a ground vehicle 102, an aircraft 104 and a satellite 106 can transfer information as in other typically fixed networks. For example, at the instant illustrated in FIG. 1, the satellite 106 is providing ground imaging information to the ground vehicle 102 via the aircraft 104. At other points in time, the aircraft 104 and/or the satellite 106 may travel and leave the network 100, and one or more other vehicles (not shown) may join the network 100. In addition, there may be fixed or stationary nodes (not shown) in the network 100. Thus, the network 100 is a mobile ad hoc network as defined herein above. Each node (e.g., the ground vehicle 102, the aircraft 104 and the satellite 106) of the network 100 typically includes one or more computers, which may be general purpose computer(s) and/or specialized computer(s) that can provide one or more services or functions. In some scenarios, one or more nodes of the network 100 may require a service that the node itself does not provide, but is performed by another node or nodes in the network.

Figure 2:
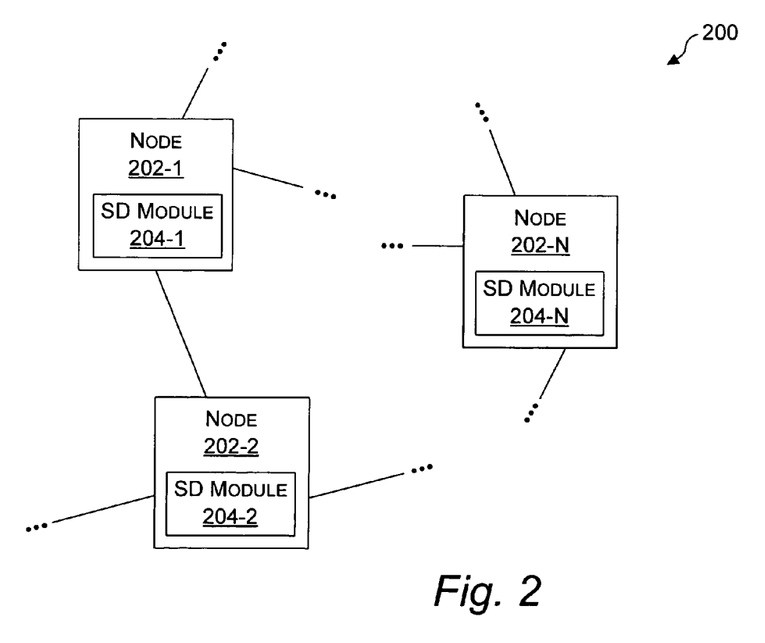
FIG. 2 is a block diagram illustrating an exemplary mobile ad hoc network in which some nodes have a service discovery module, according to one embodiment.

FIG. 2 illustrating an exemplary mobile ad hoc network 200 in which some nodes have a service discovery module, according to one embodiment. In this exemplary embodiment, the network 200 includes a set of nodes 202-1 through 202-N, each having a service discovery (SD) module 204-N. The nodes 202-1 through 202-N can represent a combination of ground vehicles (e.g., such as the ground vehicle 102 of FIG. 1) and air or space vehicles (e.g., such as the aircraft 104 and the satellite 106 of FIG. 1).

In this embodiment, the node 202-1 uses its service discovery module 204-1 to provide information (e.g., to the other nodes 202-2 through 202-N in the network 200) advertising the service or services that that the node 202-1 can provide. Similarly, the node 202-2 and so on of the network 200 can provide corresponding advertising information to the other nodes of the network 200. Each of the other nodes of the network 200 can store received advertisement information for later inspection when that node (e.g., an application executing on that node) requires a service that that node itself cannot provide. If a node cannot find locally-stored advertisement information for a service it requires, that node can then establish a link with (or send a request or other message to) the node that advertised the needed service. In this way, the requesting node can obtain the service that it needs.

In addition, when a node of the network 200 requires a service that the node itself does not provide and for which it has not stored advertisement information, that node can send a request (also referred to herein as a discovery request) to other nodes in the network 200 to determine whether other nodes in the network can provide the needed service. Zero, one or more nodes of the network 200 may respond to the discovery request by sending information (similar to advertisement information in one embodiment) that indicates that the replying node can provide the requested service. One exemplary implementation for a service discovery module is described below in conjunction with FIG. 3

Although in this embodiment each of the nodes of the network 200 has a service discovery module, in some other embodiments, one or more of the nodes may not have a service discovery module. In such networks, those nodes without a service discovery module would not participate in the advertisement/discovery processes (described below).

Figure 3:
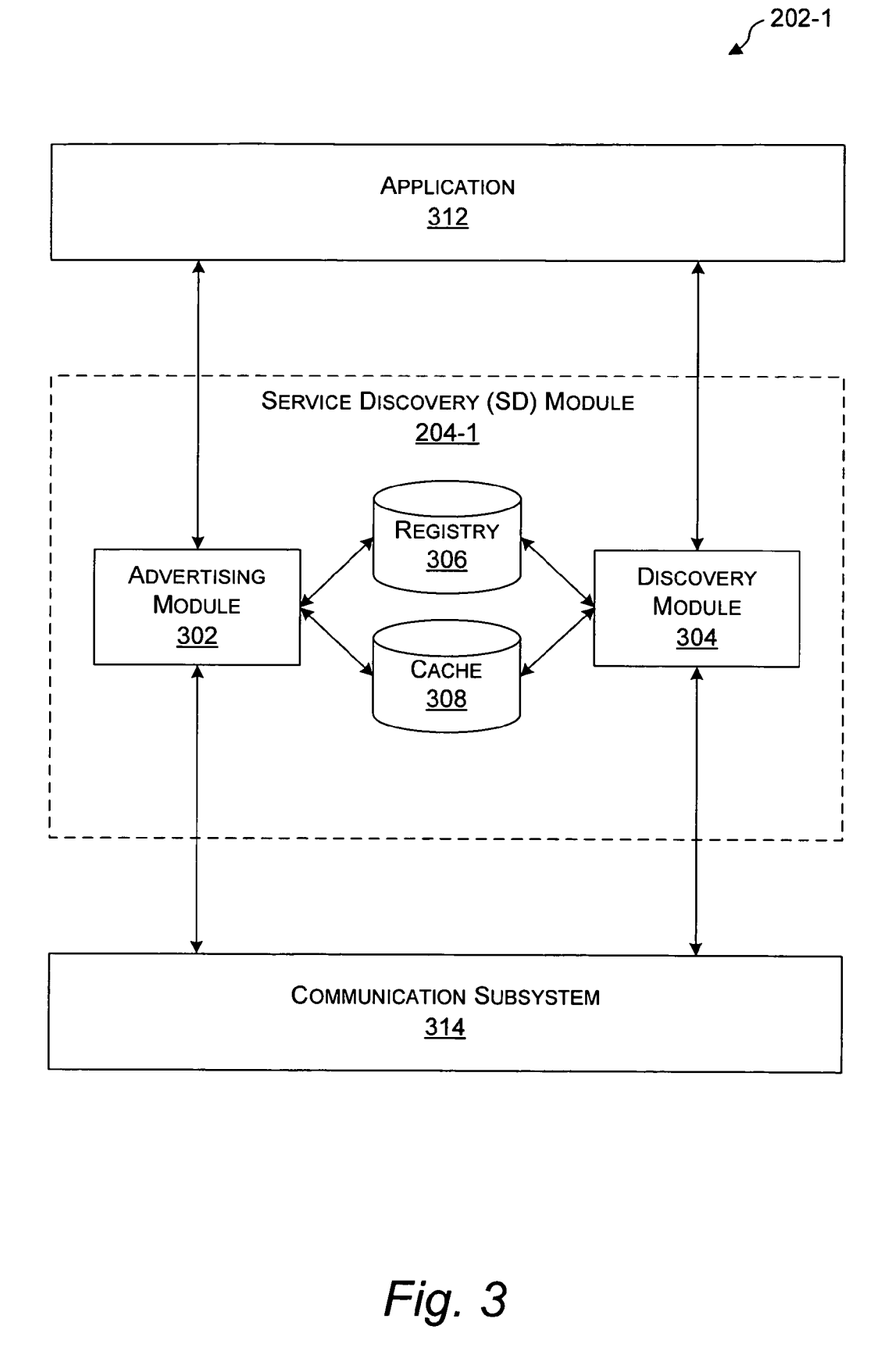
FIG. 3 is a diagram illustrating exemplary components of a service discovery module depicted in FIG. 2, according to one embodiment.

FIG. 3 illustrates exemplary components of the service discovery module 204-1 (FIG. 2), according to one embodiment. In this embodiment, the service discovery module 204-1 includes an advertising module 302, a discovery module 304, a first datastore 306 (also referred to as the registry 306 in this embodiment); and a second datastore 308 (also referred to as the cache 308 in this embodiment). In this example, the service discovery module 204-1 communicates with one or more applications 312 executing on the node 202-1 (FIG. 2) and a communication subsystem 314 (also implemented on the node 202-1).

When the node 202-1 initializes (or when a new application or other functionality begins to execute on the node), as previously mentioned, the node 202-1 can send advertisements to other nodes of the mobile ad hoc network 200 (FIG. 2). In this example embodiment, when the application 312 begins executing, the service discovery module 204-1 becomes aware of the executing application 312 and, in response, generates an advertisement for the service(s) provided by the application 312. For example, in one embodiment, during its initialization, the application 312 registers itself with the service discovery module 204-1. In response, the advertising module 302 stores information about the service(s) in the registry 306. The advertising module 302 also generates an advertising message containing advertising information of the service(s), which it then sends to other node(s) of the network 200 via the communication subsystem 314. In some embodiments, the advertising module 302 periodically transmits, multicasts, or broadcasts advertisements to other node(s) of the network 200. In some such embodiments, the rate at which the advertisements is configurable.

In addition, the node 202-1 may receive (via the communication subsystem 314) advertising information from other nodes of the network 200. In this embodiment, the discovery module 304 receives the advertisements and stores the advertisement information in the cache 308.

Further, in some embodiments, the advertising module 302 includes information defining the number of "hops" the advertisement can make. Each node that "forwards" an advertisement will then indicate that a hop was made. For example, in some embodiments, a node will decrement an advertisement hop count when forwarding an advertisement (unless the hop count is already zero, in which case the node will not forward the advertisement). In such embodiments, when the node 202-1 receives an advertisement, in addition to storing the advertisement information in the cache 308, the discovery module 304 also checks the advertisement hop count and if not zero, will forward the advertisement to other nodes in the network 200.

In a scenario in which the node 202-1 is an intermediary "hop" in a chain of forwarded advertisements, the node of the network 200 that sent the advertisement to the node 202-1 may itself have forwarded the advertisement to the node 202-1 from another node of the network 200. The service discovery modules of the nodes 202-1 through 202-N support this "node propagation" or "hopping" of advertisements.

In one embodiment, to prevent an unnecessary loading/traffic on the network 200, the advertisement also includes identifier information of the nodes forwarding the advertisement. The discovery module 304 then inspects this information before forwarding an advertisement. If the discovery module 304 finds the identifier of the node 202-1 in this information, then the discovery module 304 will not forward the advertisement (since it has already done so), thereby preventing unnecessary traffic on the network 200.

During operation of the node 202-1, one of the applications 312 may require a service that is not provided by the application. In one scenario, the service is one that is provided by the node 202-1 (e.g., by another application executing on the node 202-1). In another scenario, the service is one that is not provided by the node 202-1.

When one of the applications 312 requires a service, in one embodiment that application 312 causes the discovery module 304 to attempt to locate the service. In one such embodiment, the discovery module 304 first inspects the registry 306 to determine whether the node 202-1 can provide the service. If the required service is listed in the registry 306, the discovery module 304 provides the appropriate information to the application 312 so that that application can locate/use the service.

In contrast, if the required service is not listed in the registry 306, the discovery module 304 then inspects the cache 308 to determine whether the node has received an advertisement from another node of the network 200 that can provide the service. If the requested service is listed in the cache 308, the discovery module 304 provides the cached advertisement information to the application 312 so that the application can establish a link with the other node that advertised the service, thereby obtaining the needed service. However, if the requested service is not listed in the cache 308, the discovery module 304 can provide a "service not known" indication to the application 312. In some embodiments, the application 312 then causes the discovery module 304 to send (e.g. multicast or broadcast) a discovery request for the needed service to one or more other nodes of the network 200 via the communication subsystem 314.

In addition, the node 202-1 may receive (via the communication subsystem 314) a discovery request from another node of the network 200. In this embodiment, the discovery module 304 receives the discovery request and determines whether the node 202-1 provides the services by inspecting the registry 306. If the discovery module 304 finds the requested service listed in the registry, the discovery module 304 then sends information regarding the service to the requesting node (e.g., similar to sending an advertisement).

If the requested service is not listed in the registry 306, in one embodiment, the discovery module 304 then checks the cache 308 to determine whether another node of the network 200 provides the requested service. If the service is listed in the cache 308, the discovery module 304 then sends information for this service found in the cache 308 to the requesting node.

Further, in some embodiments, if the requested service is not found in the cache 308, the discovery module 304 can send a discovery request on behave of the requesting node to other nodes of the network 200. In one embodiment, the discovery request from the requesting node includes information defining the number of "hops" the discovery request can make. Each node that "forwards" a discovery request will then indicate that a discovery hop was made. For example, in some embodiments, a node will decrement a discovery hop count when forwarding a discovery request (unless the discovery hop count is already zero, in which case the node will not forward the discovery request). If the node 202-1 receives a response to the forwarded discovery request, the discovery module 304 will then forward the response to the requesting node. In a scenario in which the node 202-1 is an intermediary "hop" in a chain of forwarded discovery requests, the requesting node may itself have forwarded the discovery request to the node 202-1. The service discovery modules of the nodes of the network 200 support this "node propagation" of discovery requests.

Still further, in one embodiment, to prevent an unnecessary loading/traffic on the network 200, discovery requests also includes identifier information of the nodes (if any) that have forwarded the discovery request. The discovery module 304 then inspects this information before forwarding a discovery request. If the discovery module 304 finds the identifier of the node 202-1 in this information, then the discovery module 304 will not forward the discovery request (since it has already done so), thereby preventing unnecessary traffic on the network 200.

Although FIG. 3 is used to describe the operation of the service discovery node 204-1, the description of FIG. 3 can also be applied to the operation of the service discovery modules 204-2 through 204-N (FIG. 2).

Figure 4:
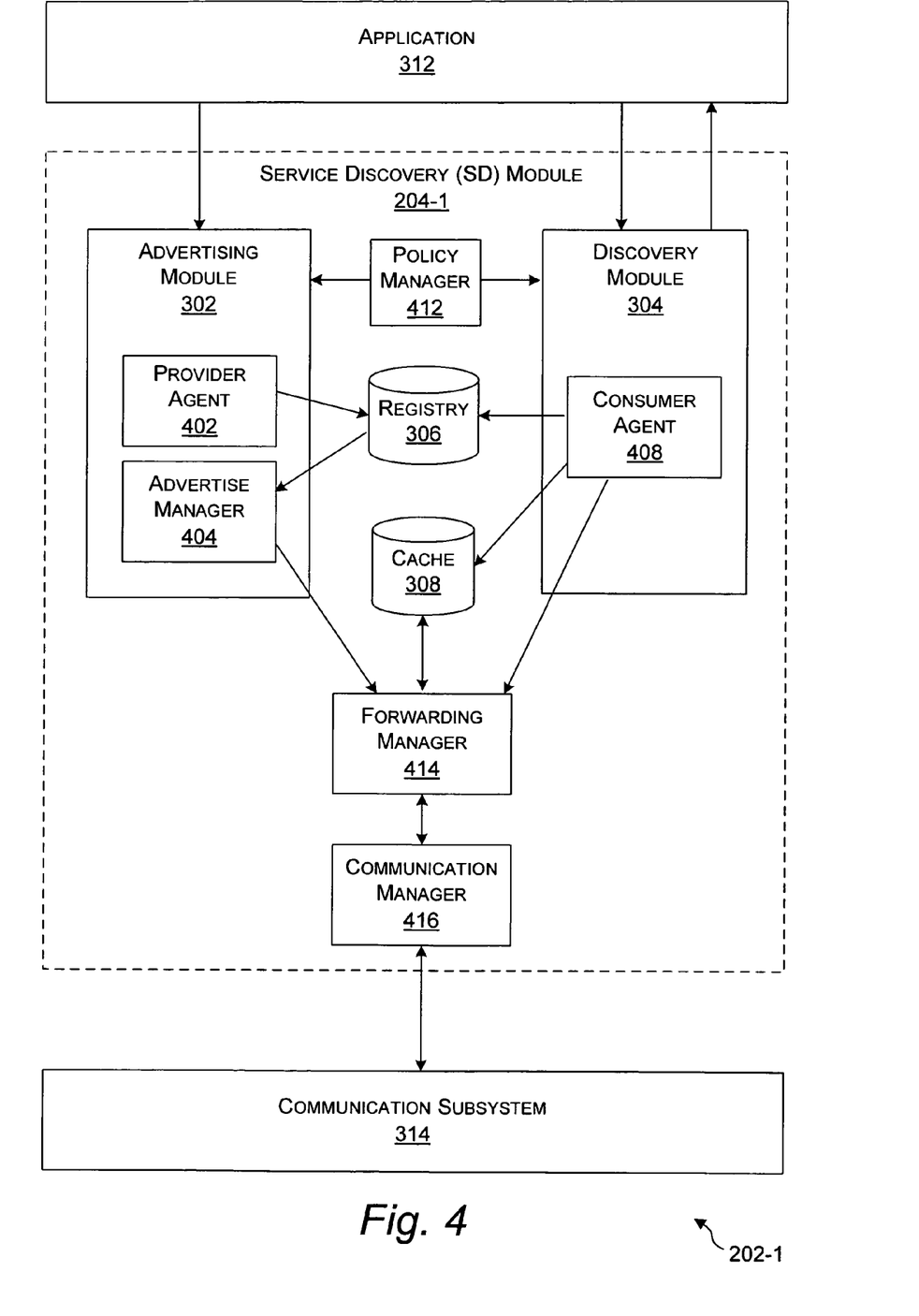
FIG. 4 is a diagram illustrating in more detail exemplary components of the service discovery module depicted in FIG. 3, according to one embodiment.

FIG. 4 illustrates in more detail exemplary components of the service discovery module 204-1 depicted in FIG. 3, according to one embodiment. In this embodiment the advertising module 302 includes a provider agent 402 and an advertise manager 404; and the discovery module 304 includes a consumer agent 408. In addition, the service discovery module 202-1 includes a policy manager 412, a forwarding manager 414 and a communications manager 416.

The provider agent 402, in this embodiment, manages the registering of services. For example, the provider agent 402 in one embodiment receives requests from application(s) 312 to register service(s) and stores information about the service(s) in the registry 306. This information is used to in providing advertisements, in responding to requests for services from the application(s) 312, and in responding to discovery requests, as described above in conjunction with FIG. 3. In some embodiments, this information may include information defining security/authentication/capabilities/interoperability features to be adhered to in sharing of information about the services. For example, in one embodiment this information may come from the policy manager 412. In addition, the policy manager 412 may also provide the number of hops allowed in forwarding advertisements, the rate at which advertisements are sent, etc.

The advertise manager 404 manages advertising operations, in this embodiment. For example, in one embodiment the advertise manager 404 inspects the registry 306 to obtain information about services to be included in advertisements to be sent out by the node 202-1. As previously described, the advertise module 404 can send out advertisements at a schedule and with a hop limit defined by the policy manager 412.

The consumer agent 408 manages discovery operations in this embodiment. For example, the consumer agent 408 receives requests from application(s) 312 for services and determines whether a requested service can be provided by the node 202-1 by inspecting the services (if any) listed in the registry 306. If the requested service is not listed in the registry 306, in this embodiment the consumer agent 408 determines whether the requested service can be provided by another node (e.g., one of nodes 202-2 through 202-N depicted in FIG. 2) by inspecting the services (if any) listed in the cache 308. If the requested service is also not listed in the cache 308, in this embodiment the consumer agent 408 can send out a discovery request to other node(s) of the system 200 (FIG. 2). The policy manager 412 may specify to the discovery module 304 the number of hops allowed in forwarding discovery requests.

The forwarding manager 414, in this embodiment, manages the transfer of advertisements from the advertising module 302 and discovery requests from the discovery module 304 to the communication manager 416 for transmission to other nodes of the network 200. In addition, in this embodiment, the forwarding manager 414 also receives advertisements from other nodes in the network 200 (via the communication manager 416) and stores the received advertisement information in the cache 308. The forward manager 414 can selectively forward advertisement/discovery requests to certain neighboring nodes set by the policy manager. For example, in one embodiment, the forwarding manager 414 may implement interoperability levels as described in U.S. Patent Application No. 2004/0174822A1 filed Mar. 5, 2003 and incorporated herein by reference. As disclosed in U.S. Patent Application No. 2004/0174822A1, the levels of interoperability can be defined for each node of a network as a function of a role assigned to each node. The roles are assigned based on the capabilities and resources of each individual node. Then information (e.g., advertisements, discovery requests) can be communicated between nodes having compatible interoperability levels.

The communication manager 416, in this embodiment, manages the formatting and transfer of advertisements, discovery requests, etc. to the communication subsystem 314 (for transmission over the "physical" medium (can be wired or wireless), and the reception of advertisements and discovery requests, etc. from other nodes of the network 200 via the communication subsystem 314. The communication manager also detects new links or broken links with neighboring nodes and adjusts the cache entries accordingly.

These features (e.g., levels of interoperability, advertisements, discovery requests, control of hop counts, etc.) can be configured and used to facilitate a robust network scalability.

Figure 5:
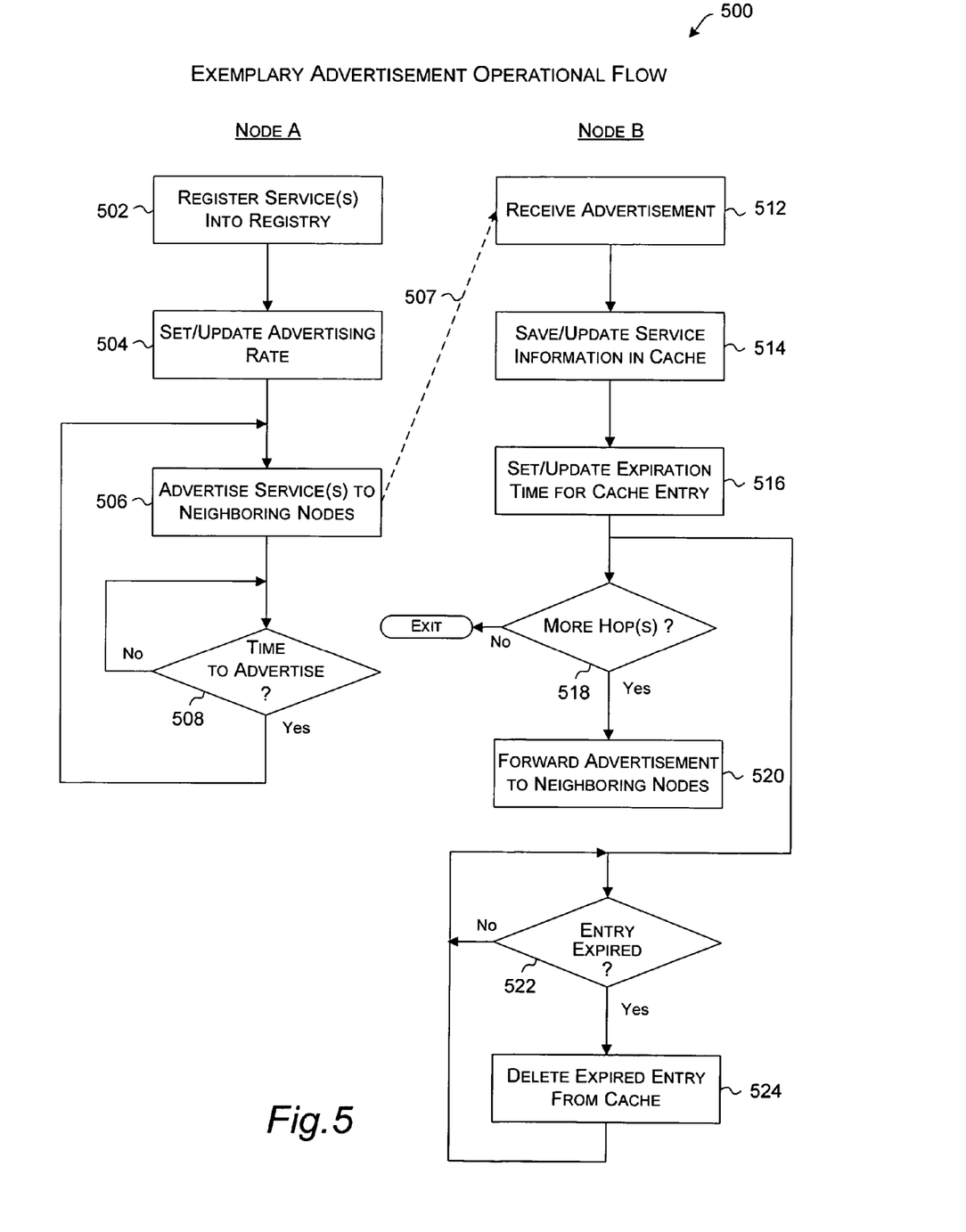
FIG. 5 is a flow diagram illustrating operational flow in advertising a service, according to one embodiment.

FIG. 5 illustrates an exemplary operational flow 500 in advertising a service, according to one embodiment. The operational flow 500 may be performed in any suitable computing environment. For example, the operational flow 500 may be performed by a system such as that illustrated by the node 202-1 (FIG. 3). Therefore, the description of the operational flow 500 may refer to at least one of the components of FIG. 3. However, any such reference to components of FIG. 3 is for descriptive purposes only, and it is to be understood that the implementation of FIG. 3 is a non-limiting environment for the operational flow 500. In this exemplary embodiment, a first portion of the operational flow 500 is performed by a node (indicated as a Node A in FIG. 5) that is advertising a service, whereas a second portion of the operational flow 500 is performed by another node (indicated as a Node B in FIG. 5) that receives the advertisement.

At a block 502, one or more services are registered into a datastore of a node (i.e., the Node A) of a mobile ad hoc network. In one embodiment, an application or application component such as, for example, application 312 (FIG. 3) registers a service in a registry such as the registry 306 (FIG. 3). In this embodiment, the registry is part of a service discovery module such as the service discovery module 204-1 (FIG. 3). In some embodiments, the node is part of a mobile ad hoc network such as the network 200 (FIG. 2).

At a block 504, a rate at which the service is advertised is set (or updated). In one embodiment, the aforementioned service discovery module has a component or module that defines the advertising rate. For example, the component or module is a policy manager such as the policy manager 412 (FIG. 4). This operation is can be advantageous because some mobile ad hoc networks can add (and lose) nodes at various unpredictable times.

At a block 506, the service(s) registered at the block 502 are advertised to one or more other nodes of the network. In one embodiment, the aforementioned service discovery module sends (e.g., by broadcasting) an advertisement over the network for each registered service. The advertisement can then be received by another node (i.e., the Node B) as indicated by a dashed line 507 in FIG. 5.

At a block 508, it is determined whether it is time to send another advertisement according to the advertising rate set at the block 504. If yes, the operational flow 500 returns to the block 506 to send out another advertisement. If no, the operational flow 500 returns to the block 508 to determine whether it is time to send another advertisement again. In this embodiment, the block 508 provides as a periodic timeout so that advertisements are sent over the network at the advertising rate of the block 504. This loop will continue until interrupted for example, by the Node A being shut down (this operation not shown). During Node A looping for advertising process, new service from application can be registered to or removed from registry by Provider Agent.

The blocks 502, 504, 506 and 508 in effect implement the aforementioned first portion of the operational flow 500 performed by the Node A. The blocks of the operational flow 500 described below form the aforementioned second portion of the operational flow 500 performed by the Node B.

At a block 512, an advertisement is received. In this embodiment, the advertisement was send by the Node A at the block 506 and received by the Node B, as indicated by the dashed line 507. In one embodiment, a service discovery module (such as the service discovery module 204-1 depicted in FIG. 3) of the Node B receives the advertisement via a communications subsystem such as the communication subsystem 314 (FIG. 3). For example, the service discovery module may include a component or module such as the forwarding manager 414 (FIG. 4) to receive the advertisement via a module or component such as the communication manager 416 (FIG. 4).

At a block 514, information from the received advertisement is stored. In one embodiment, the advertisement information is stored in a cache such as the cache 308 (FIG. 3). This cache basically lists service(s) that can be provided by other nodes in the network. In one embodiment, a module or component (of the service discovery module) such as the discovery module 304 depicted in FIG. 3 stores the advertisement information in the cache. In some scenarios, a node can periodically send the same advertisement(s), which would then be updated in the cache (rather than added as a new entry). For example, the update can include updating a timestamp of when the advertisement was stored in the cache. In some scenarios, the amount of storage limit has reached, the policy manager will direct how to store new entries in the cache, e.g. replacing the oldest entry.

At a block 516, an expiration time is set for the advertisement information stored in the cache at the block 514. In one embodiment, the aforementioned discovery module sets the expiration time for the information. In some embodiments, the expiration time may be provided by the aforementioned policy manager. The operational flow 500 can then proceed to blocks 518 and 522.

At the block 518, it is determined whether the received advertisement should be forwarded to other nodes in the network. In this embodiment, it is determined whether the number of times of the received advertisement has been forwarded (i.e., "hops") from the node that originated the advertisement has reached the number of "hops" authorized for that advertisement. For example, in some embodiments, when an advertisement is first send by a node (e.g., see the block 506), the advertisement includes a property or value representing the number of hops "remaining" for the advertisement. This value, in such embodiments, would then be compared to zero to determine whether the received advertisement should be forwarded. This value is then decremented when the advertisement is sent. If it is determined that the advertisement should be forwarded, the operational flow 500 proceeds to a block 520; otherwise the operational flow 500 exits.

At the block 520, the advertisement received at the block 512 is forwarded to other nodes of the network. In this embodiment, a component or module such as the forwarding manager 414 (FIG. 4) forwards the advertisement to other nodes in the network. In some embodiments, the number remaining hops is also decremented when the advertisement is forwarded.

At the block 522, it is determined whether the listing of any advertisement in the cache has expired. In one embodiment, the aforementioned discovery module determines whether a timestamp associated with each entry has expired. In some embodiments, the expiration time may be represented by a time "offset" that is added to an entry's timestamp and then compared to the current time. If it is determined that no entry has expired, the operational flow 500 loops back to perform the block 522 again (unless another advertisement causes the block 512 to be performed again). However, if it is determined that an entry has expired, the operational flow 500 proceeds to a block 524.

At the block 524, the expired entry is deleted from the cache. In one embodiment, the aforementioned discovery module deletes the expired entry from the cache. This feature (i.e., the feature implemented by the blocks 522 and 524) can be advantageously used to help ensure that only currently-available services are listed in the cache. For example, a node providing a service may leave the mobile ad hoc network, resulting in that service no longer being available to the network. After a certain time, the advertisement will be deleted if not updated by periodic broadcasts of the advertisement by the originating node. The operational flow 500 then loops back to the block 522 to determine whether any other cache entries have expired.

Although the operational flow 500 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Figure 6:
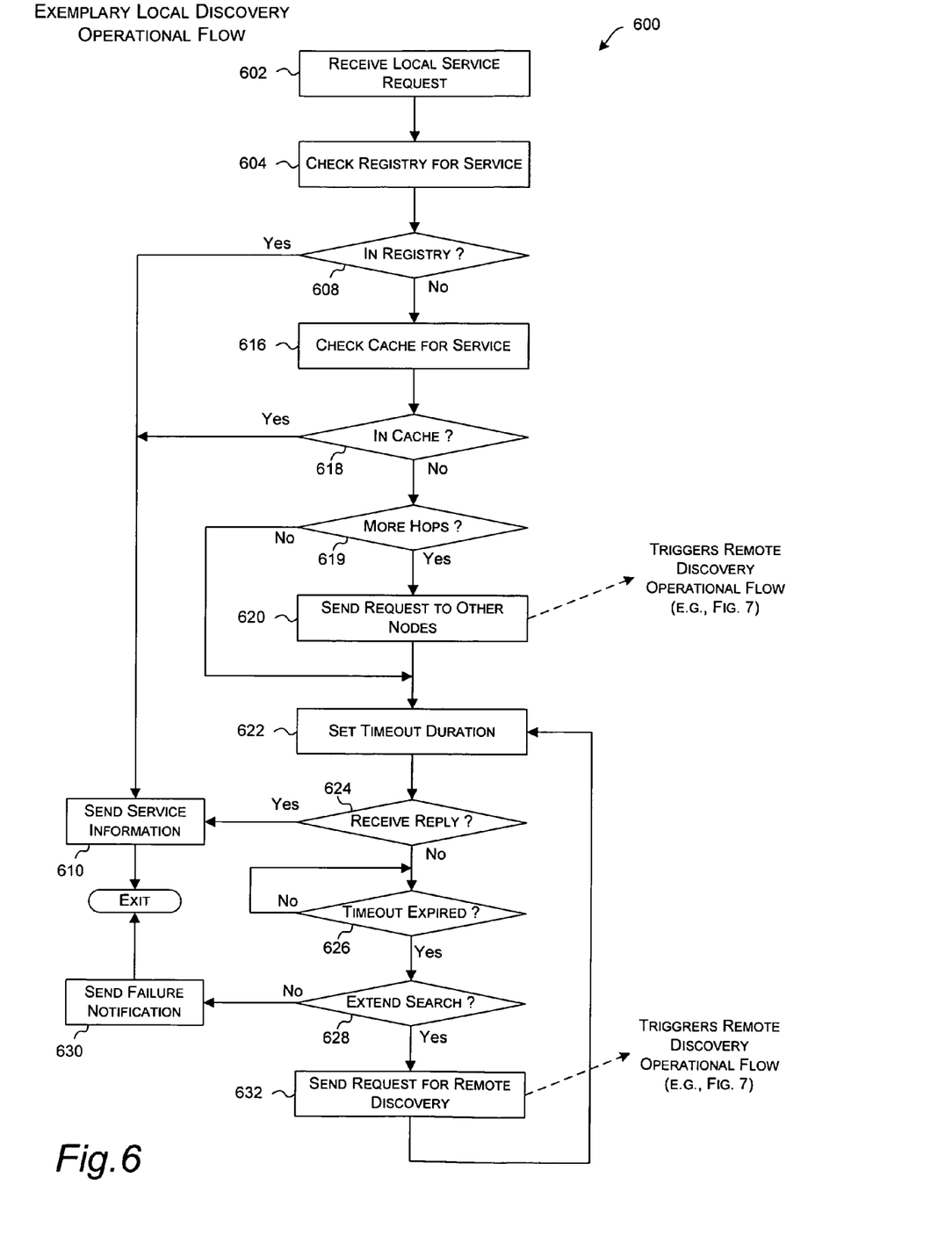
FIG. 6 is a flow diagram illustrating operational flow in locally discovering a service, according to one embodiment.

FIG. 6 illustrates an exemplary operational flow 600 in a local discovery service, according to one embodiment. The operational flow 600 may be performed in any suitable computing environment. For example, the operational flow 600 may be performed by a system such as that illustrated by the node 202-1 (FIG. 3). Therefore, the description of the operational flow 600 may refer to at least one of the components of FIG. 3. However, any such reference to components of FIG. 3 is for descriptive purposes only, and it is to be understood that the implementation of FIG. 3 is a non-limiting environment for the operational flow 600.

At a block 602, a service request is received locally at a node of a mobile ad hoc network. In one embodiment, a module or component such as the discovery module 304 (FIG. 3) receives a service request from an application executing on the node. For example, the service request can come from an application such as the application 312 (FIG. 3).

At a block 604, a datastore on the node is checked for the service. In one embodiment, the datastore is a registry such as the registry 306 (FIG. 3) and is checked by the aforementioned discovery module. In this embodiment, the registry includes advertising information stored there by applications executing on the node.

At a block 608, it is determined whether the requested service is listed in this datastore. In this embodiment, the aforementioned discovery module inspects the registry to determine whether the node itself can provide the service (e.g., by another application executing on the node). If the requested service is listed in this datastore, the operational flow 600 proceeds to a block 610. Otherwise, the operational flow 600 proceeds to a block 616.

At the block 610, information regarding the service is sent to this requestor (e.g., an application executing on the node). In one embodiment, the aforementioned discovery module sends information to the requestor that allows the requestor to locally obtain the service. From the block 610, the operational flow 600 then exits in this embodiment.

At the block 616, another datastore on the node is checked for the requested service. In one embodiment, this datastore is a cache such as the cache 308 (FIG. 3). In this embodiment, the cache stores advertising information received from other nodes of the ad hoc network. If the requested service is listed in this datastore, the operational flow 600 proceeds to the block 610 (described above). Otherwise, the operational flow 600 proceeds to a block 619.

At the block 619, whether the service request received at the block 602 should be forwarded to other nodes in the network. In this embodiment, it is determined whether the number of times of the service request has been forwarded (i.e., "hops") has reached the number of "hops" authorized for that service request. For example, in some embodiments, when a service request is first send by a local application, the service request includes a property or value representing the number of hops "remaining" for the service request. This value is determined by a module such as the policy manager 414 (FIG. 4) in one embodiment. If the request is not to be forwarded, then this value can be initialized to zero. This value, in such embodiments, would then be compared to zero to determine whether the service request should be forwarded. This value is then decremented when the service request is sent to the other nodes of the network. If it is determined that the discovery request should be forwarded, the operational flow 600 proceeds to a block 620; otherwise the operational flow 600 proceeds to a block 622.

At the block 620, the service request is forwarded to other node(s) of the network. In this embodiment, the aforementioned discovery module forwards the service request to other nodes in the network via components or modules such as the forwarding manager 414 (FIG. 4) and communication manager 416 (FIG. 4) and the aforementioned communication subsystem. This forwarded service request can trigger a remote discovery operational flow (describe below in conjunction with FIG. 7) in another node of the ad hoc network.

At a block 622, the duration of a timeout is set. In this embodiment, the timeout defines the amount of time the node is to wait to receive a reply to the discovery request that was forwarded at the block 620. In one embodiment, the timeout is started by the aforementioned discovery module. In some embodiments, the value of the timeout is provided by a policy manager.

At a block 624, it is determined whether a reply to the discovery request has been received. In one embodiment, the discovery module determines whether a reply to the service request was received. If it is determined that a reply was received, the operational flow 600 proceeds to the block 610 (described above). Otherwise, the operational flow 600 proceeds to a block 626.

At the block 626, it is determined whether the timeout (set at the block 622) has expired. In one embodiment, the discovery module determines whether the timeout has expired. If it is determined that the timeout has not expired, the operational flow 600 loops back to perform the block 626 again. However, it is determined that the timeout has expired, the operational flow 600 proceeds to a block 628.

At the block 628, it is determined whether to extend the search for the requested service. In one embodiment, if the timeout expires without receiving a reply to the forwarded service request, the discovery module determines whether to send another request for the service. In some embodiments, this extended search for the requested service can have an increased number of hops and/or an increased timeout to increase the chance of the forwarded service request reaching a node of the network that can provide the requested service. In one embodiment, the aforementioned policy manager can set new values for the number of hops and the timeout duration for extended searches. If it is determined that the search is not extended, the operational flow 600 proceeds to a block 630. Otherwise, the operational flow 600 proceeds to a block 632.

At the block 630, a failure notification is sent to the requestor (e.g., the local application that requested the service that was received at the block 602). The operational flow 600 then exits after the block 630.

At the block 632, the service request is forwarded to other node(s) of the network. In this embodiment, the block 632 is similar to the block 620, except that the service request may be modified to increase the number of hops and/or increase the timeout duration for waiting for a reply to the extended service request. This extended service request can trigger a remote discovery operational flow (describe below in conjunction with FIG. 7) in another node of the ad hoc network. The operational flow 600 then loops back to the block 622 to set the timeout duration and wait for a reply to the extended service request.

Although the operational flow 600 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Figure 7:
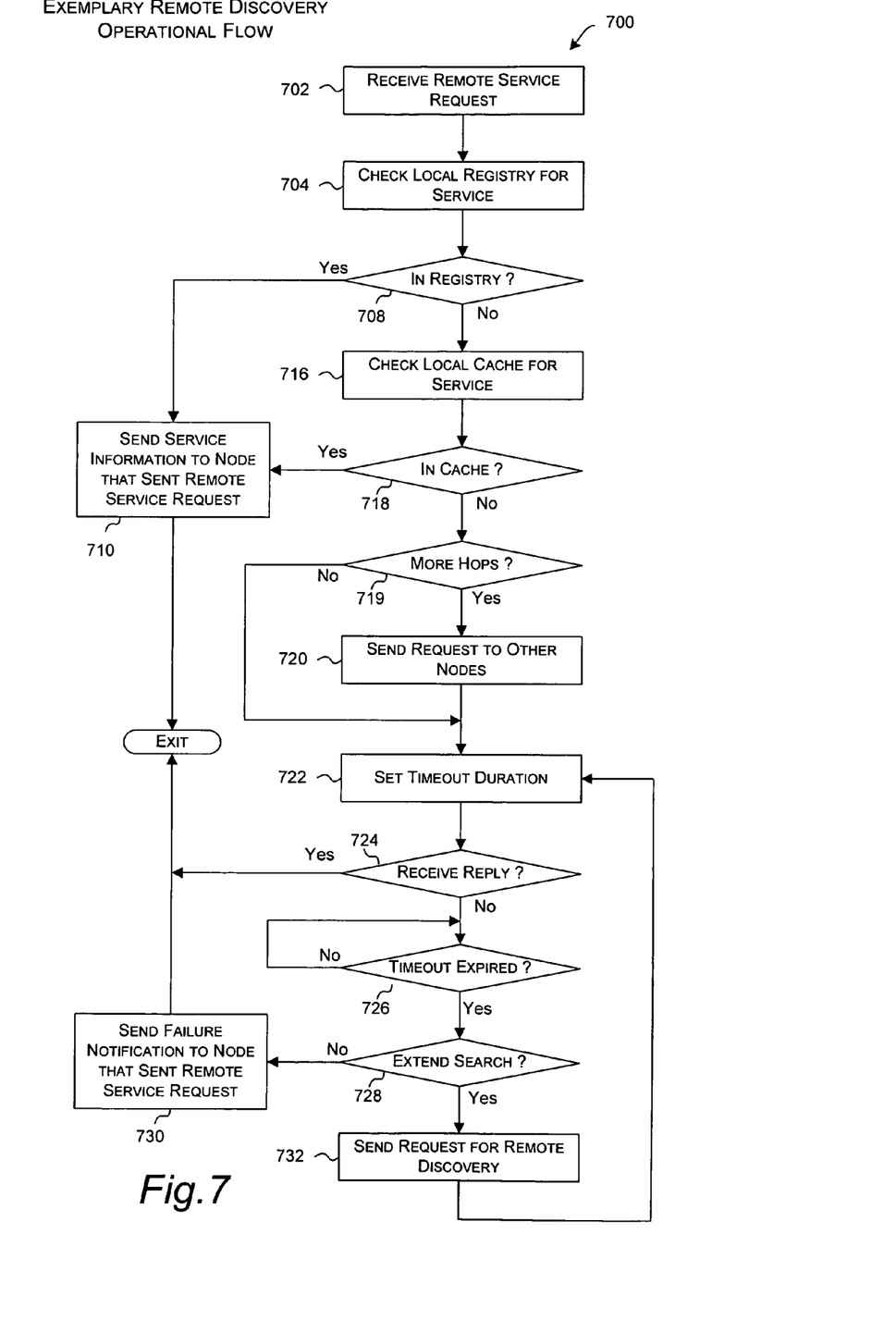
FIG. 7 is a flow diagram illustrating operational flow in remotely discovering a service, according to one embodiment.

FIG. 7 illustrates an exemplary operational flow 700 in a remote discovery service, according to one embodiment. The operational flow 700 may be performed in any suitable computing environment. For example, the operational flow 700 may be performed by a system such as that illustrated by the node 202-1 (FIG. 3). Therefore, the description of the operational flow 700 may refer to at least one of the components of FIG. 3. However, any such reference to components of FIG. 3 is for descriptive purposes only, and it is to be understood that the implementation of FIG. 3 is a non-limiting environment for the operational flow 700.

At a block 702, a service request is received at a node of a mobile ad hoc network. In the operational flow 700, the service request was sent from another node of the ad hoc network (e.g., see the blocks 620 and 632 of FIG. 6). In one embodiment, a module or component such as the discovery module 304 (FIG. 3) receives the service request from another node. For example, the service request can be received by the discovery module via a communication subsystem (e.g. such as the communication subsystem 314 depicted in FIG. 3).

At a block 704, a datastore on the node is checked for the service. In one embodiment, the datastore is a registry such as the registry 306 (FIG. 3) and is checked by the aforementioned discovery module. In this embodiment, the registry includes advertising information stored there by applications executing on the node.

At a block 708, it is determined whether the requested service is listed in this datastore. In this embodiment, the aforementioned discovery module inspects the registry to determine whether the node itself can provide the service (e.g., by another application executing on the node). If the requested service is listed in this datastore, the operational flow 700 proceeds to a block 710. Otherwise, the operational flow 700 proceeds to a block 716.

At the block 710, information regarding the service is sent to the requesting node. In one embodiment, the aforementioned discovery module sends information to the requesting node that allows the requesting node to obtain the service or to reply the found information to the up-stream requesting node, and the process continue at any up-stream requesting node until the "original" requesting node is reached. From the block 710, the operational flow 700 then exits in this embodiment.

At the block 716, another datastore on the node is checked for the requested service. In one embodiment, this datastore is a cache such as the cache 308 (FIG. 3). In this embodiment, the cache stores advertising information received from other nodes of the ad hoc network. If the requested service is listed in this datastore, the operational flow 700 proceeds to the block 710 (described above). Otherwise, the operational flow 700 proceeds to a block 719.

At the block 719, whether the service request received at the block 702 should be forwarded to other nodes in the network. In this embodiment, it is determined whether the number of times of the service request has been forwarded (i.e., "hops") has reached the number of "hops" authorized for that service request. For example, in some embodiments, when a service request is first send by the "originating node", the service request includes a property or value representing the number of hops "remaining" for that service request. This value, in such embodiments, would then be compared to zero to determine whether the service request should be forwarded. This value is then decremented when the service request is sent to the other nodes of the network. If it is determined that the advertisement should be forwarded, the operational flow 700 proceeds to a block 720; otherwise the operational flow 700 proceeds to a block 722.

At the block 720, the service request is forwarded to other node(s) of the network. In this embodiment, the discovery module forwards the service request to other node(s) in the network via components or modules such as the forwarding manager 414 (FIG. 4), the communication manager 416 (FIG. 4) and the aforementioned communication subsystem. This forwarded service request can trigger a remote discovery operational flow in another node of the ad hoc network.

At a block 722, the duration of a timeout is set. In this embodiment, the timeout defines the amount of time the node is to wait to receive a reply to the discovery request that was forwarded at the block 720. In one embodiment, the timeout is started by the aforementioned discovery module. In some embodiments, the value of the timeout is provided by a policy manager.

At a block 724, it is determined whether a reply to the discovery request has been received. In one embodiment, the discovery module determines whether a reply to the service request was received. If it is determined that a reply was received, the operational flow 700 proceeds to the block 710 (described above). Otherwise, the operational flow 700 proceeds to a block 726.

At the block 726, it is determined whether the timeout (set at the block 722) has expired. In one embodiment, the discovery module determines whether the timeout has expired. If it is determined that the timeout has not expired, the operational flow 700 loops back to perform the block 726 again. However, it is determined that the timeout has expired, the operational flow 700 proceeds to a block 728.

At the block 728, it is determined whether to extend the search for the requested service. In one embodiment, if the timeout expires without receiving a reply to the forwarded service request, the discovery module determines whether to send another request for the service. In some embodiments, this extended search for the requested service can have an increased number of hops and/or an increased timeout to increase the chance of the forwarded service request reaching a node of the network that can provide the requested service. In one embodiment, the aforementioned policy manager can set new values for the number of hops and the timeout duration for extended searches. If it is determined that the search is not extended, the operational flow 700 proceeds to a block 730. Otherwise, the operational flow 700 proceeds to a block 732.

At the block 730, a failure notification is sent to the requesting node. In one embodiment, the aforementioned discovery module sends the failure notification to the requesting node. In some scenarios, the failure request can be propagated back to the original requesting node through intervening nodes. The operational flow 700 then exits after the block 730. In other embodiments, no failure notification is sent. In such embodiments, the requesting node will have set a timeout period, which will generate a failure notification upon expiration of a timeout (e.g., see block 630 of FIG. 6) without receiving a reply.

At the block 732, the service request is forwarded to other node(s) of the network. In this embodiment, the block 732 is similar to the block 720, except that the service request may be modified to increase the number of hops and/or increase the timeout duration for waiting for a reply to the extended service request. The operational flow 700 then loops back to the block 722 to set the timeout duration and wait for a reply to the extended service request.

Although the operational flow 700 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A network node comprising:
a communication subsystem; and
a service discovery module comprising a service cache for storing a plurality of service entries, each service entry comprising information about a service provided by a providing node, the service discovery module configured to:
receive a service advertisement via the communication subsystem, the service advertisement comprising information about a service provided by a providing node;
store the information about the service provided by the providing node as a service entry in the service cache;
forward the service advertisement to a neighboring node;
receive a request for a service;
check the service cache for a service entry related to the requested service; and
if a service entry is listed in the service cache for the requested service, respond to the request with the information from the listed service entry, and, if no service entry is listed in the service cache for the requested service, forward the request to a neighboring node via the communication subsystem.

2. The network node of claim 1, wherein the service discovery module is configured to receive the request for the service via the communication subsystem and respond to the request via the communication subsystem.

3. The network node of claim 1, wherein the network node is configured to execute an application, wherein the service discovery module is configured to receive the request for the service from the application.

4. The network node of claim 1, wherein the network node is configured to execute an application, the application providing a service, wherein the service discovery module further comprises a local service registry, wherein the service discovery module is further configured to:
store information about the service provided by the application in the local service registry; and before checking the service cache for a service entry related to the requested service:
  determine whether the requested service is listed in the local service registry; and
  if the requested service is listed in the local service registry, respond to the request with information about the service provided by the application.

5. The network node of claim 1, wherein the service advertisement further comprises a maximum number of times for the service advertisement to be forwarded, wherein the service discovery module is further configured to:
  determine whether the service advertisement should be forwarded based on the maximum number of times for the service advertisement to be forwarded; and
  forward the service advertisement to a neighboring node based on determining that the service advertisement should be forwarded.

6. The network node of claim 5, wherein the service advertisement further comprises identifier information of other nodes that have forwarded the service advertisement, wherein the service discovery module is further configured to:
  determine whether the identifier information of other nodes that have forwarded the service advertisement includes an identifier of the neighboring node; and
  forward the service advertisement to the neighboring node based on determining that the identifier information of other nodes that have forwarded the service advertisement does not include an identifier of the neighboring node.

7. The network node of claim 5, wherein an interoperability level is defined for each of the network node and the neighboring node, wherein the network node is further configured to forward the service advertisement to the neighboring node only if the interoperability level of the network node is compatible with the interoperability level of the neighboring node.

8. The network node of claim 1, wherein the request for the service comprises a maximum number of times for the request to be forwarded, wherein the service discovery module is further configured to:
  before forwarding the request to the neighboring node, determine whether the request should be forwarded based on the maximum number of times for the request to be forwarded; and
  forward the request to the neighboring node only if the request should be forwarded.

9. The network node of claim 8, wherein the request further comprises identifier information of other nodes that have forwarded the request, wherein the service discovery module is further configured to forward the request to the neighboring node only if the identifier information of other nodes that have forwarded the request does not include an identifier of the neighboring node.

10. The network node of claim 8, wherein the service discovery module is further configured to set a timeout duration for the forwarded request, the timeout duration defining an amount of time to wait for a response to the forwarded request.

11. The network node of claim 10, wherein the service discovery module is further configured to:
  determine whether a reply to the forwarded request has been received from the neighboring node within the timeout duration; and
  if no reply has been received within the timeout duration, respond to the request with a failure notification.

12. The network node of claim 10, wherein forwarding the request to the neighboring node comprises forwarding the request to the neighboring node a first time, wherein the service discovery module is further configured to:
  determine whether a reply to the forwarded request has been received from the neighboring node within the timeout duration; and
  if no reply has been received within the timeout duration, forward the request to the neighboring node a second time with an increase in one or more of the following: the maximum number of times for the request to be forwarded, and the timeout duration.

13. The network node of claim 1, wherein the service discovery module is further configured to:
  detect a broken link to the providing node; and
  adjust the service cache based on the detected broken link.

14. The network node of claim 1, wherein an interoperability level is defined for each of the network node and the neighboring node, wherein the network node is further configured to forward the request to the neighboring node only if the interoperability level of the network node is compatible with the interoperability level of the neighboring node.

15. A network comprising a first node and a second node, each of the first node and the second node comprising a service cache, each of the first node and the second node configured to:
  receive a service advertisement comprising information about a service provided by a providing node;
  store the information about the service provided by the providing node as a service entry in the service cache;
  forward the service advertisement to one or more other nodes;
  receive a request for a service;
  check the service cache for a service entry related to the requested service; and
  if a service entry is listed in the service cache for the requested service, respond to the request with the information from the listed service entry, and, if no service entry is listed in the service cache for the requested service, forward the request to another node.

16. The network of claim 15, wherein each of the first node and the second further comprises a local service registry, wherein each of the first node and the second node is further configured to:
  execute an application providing a service;
  store information about the service provided by the application in the local service registry; and
  before checking the service cache for a service entry related to the requested service:
    determine whether the requested service is listed in the local service registry; and
    if the requested service is listed in the local service registry, respond to the request with information about the service provided by the application.

17. The network of claim 16, wherein the received service advertisement is a first service advertisement, wherein each of the first node and the second node is further configured to send a second service advertisement advertising the service information stored in the local service registry to one or more other nodes.

18. The network of claim 17, wherein each of the first node and the second node is further configured to send the second service advertisement to one or more other nodes periodically.

19. The network of claim 17, wherein each of the first node and the second node is further configured to send the second service advertisement to one or more nodes by broadcasting the second service advertisement to a plurality of other nodes.

20. The network of claim 17, wherein each of the first node and the second node is further configured to include in the second service advertisement a maximum number of times for the second service advertisement to be forwarded.

21. The network of claim 15, wherein the service advertisement comprises a maximum number of times for the service advertisement to be forwarded, wherein each of the first node and the second node is further configured to:
   determine whether the service advertisement should be forwarded based on the maximum number of times for the service advertisement to be forwarded; and
   forward the service advertisement to one or more other nodes based on determining that the service advertisement should be forwarded.

22. The network of claim 21, wherein the service advertisement comprises identifier information of nodes that have forwarded the service advertisement, wherein each of the first node and the second node is further configured to forward the service advertisement only to one more other nodes not having identifier information in the identifier information of other nodes that have forwarded the service advertisement.

23. The network of claim 21, wherein an interoperability level is defined for each of the first node and the second node, wherein each of the first node and the second node is further configured to forward the service advertisement to another node only if the interoperability level defined for the node is compatible with an interoperability level of the other node.

24. The network of claim 15, wherein the request for the service comprises a maximum number of times for the request to be forwarded, wherein each of the first node and the second node is further configured to:
   before forwarding the request to another node, determine whether the request should be forwarded based on the maximum number of times for the request to be forwarded; and
   forward the request to another node only if the request should be forwarded.

25. The network of claim 24, wherein the request further comprises identifier information of nodes that have forwarded the request, wherein each of the first node and the second node is further configured to forward the request to another node only if the identifier information of nodes that have forwarded the request does not include an identifier of the other node.

26. The network of claim 24, wherein each of the first node and the second node is further configured to set a timeout duration for the forwarded request, the timeout duration defining an amount of time to wait for a response to the forwarded request.

27. The network node of claim 26, wherein each of the first node and the second node is further configured to:
   determine whether a reply to the forwarded request has been received within the timeout duration; and
   if no reply has been received within the timeout duration, respond to the request with a failure notification.

28. The network of claim 26, wherein forwarding the request comprises forwarding the request a first time, wherein each of the first node and the second node is further configured to:
   determine whether a reply to the forwarded request has been received within the timeout duration; and
   if no reply has been received within the timeout duration, forward the request a second time with an increase in one or more of the following: the maximum number of times for the request to be forwarded, and the timeout duration.

29. The network of claim 15, wherein the service advertisement is a first service advertisement, wherein each of the first node and the second node is further configured to:
   associate an expiration time with the service entry in the service cache;
   receive a second service advertisement comprising information about the service from the first service advertisement;
   update the expiration time of the service entry based on the second service advertisement; and
   if the expiration time is reached, delete the service entry from the service cache.

30. The network of claim 15, wherein the network is a mobile ad hoc network.

31. A method for discovering a service in a first node of a network, the method comprising:
   receiving at the first node a service advertisement comprising information about a service provided by a second node;
   storing the information about the service provided by the second node as a service entry in a service cache;
   forwarding the service advertisement to a fifth node;
   receiving a request for a service from a third node;
   checking the service cache for a service entry related to the requested service; and
   if a service entry is listed in the service cache for the requested service, responding to the request with the information from the listed service entry, and, if no service entry is listed in the service cache for the requested service, forwarding the request to a fourth node.

32. The method of claim 31, further comprising:
   executing at the first node an application providing a service;
   storing information about the service provided by the application in a local service registry; and
   before checking the service cache for a service entry related to the requested service:
      determining whether the requested service is listed in the local service registry; and
      if the requested service is listed in the local service registry, responding to the request with information about the service provided by the application.

33. The method of claim 31, wherein the service advertisement further comprises a maximum number of times for the service advertisement to be forwarded, the method further comprising:
   determining whether the service advertisement should be forwarded based on the maximum number of times for the service advertisement to be forwarded; and
   forwarding the service advertisement to a fifth node based on said determining.

34. The method of claim 33, wherein the service advertisement further comprises identifier information of other nodes that have forwarded the service advertisement, wherein forwarding the service advertisement to a fifth node comprises:
   determining whether the identifier information of other nodes that have forwarded the service advertisement includes an identifier of the fifth node; and
   forwarding the service advertisement to the fifth node based on determining that the identifier information of other nodes that have forwarded the service advertisement does not include an identifier of the fifth node.

35. The method of claim 33, further comprising defining an interoperability level for each of the first node and the fifth node, wherein forwarding the service advertisement to the fifth node comprises forwarding the service advertisement to the fifth node only if the interoperability level of the first node is compatible with the interoperability level of the fifth node.

36. The method of claim 31, wherein the request for the service comprises a maximum number of times for the request to be forwarded, wherein forwarding the request to a fourth node comprises:
  before forwarding the request to the fourth node, determining whether the request should be forwarded based on the maximum number of times for the request to be forwarded; and
  forwarding the request to the fourth node only if the request should be forwarded.

37. The method of claim 36, wherein the request further comprises identifier information of nodes that have forwarded the request, wherein forwarding the request to a fourth node further comprises forwarding the request to the fourth node only if the identifier information of nodes that have forwarded the request does not include an identifier of the fourth node.

38. The method of claim 36, further comprising setting a timeout duration for the forwarded request, the timeout duration defining an amount of time to wait for a response to the forwarded request.

39. The method of claim 38, further comprising:
  determining whether a reply to the forwarded request has been received within the timeout duration; and
  if no reply has been received within the timeout duration, responding to the request with a failure notification.

40. The method of claim 38, wherein forwarding the request comprises forwarding the request a first time, the method further comprising:
  determining whether a reply to the forwarded request has been received within the timeout duration; and
  if no reply has been received within the timeout duration, forwarding the request a second time with an increase in one or more of the following: the maximum number of times for the request to be forwarded, and the timeout duration.

41. The method of claim 31, further comprising defining an interoperability level for each of the first node and the fourth node, wherein forwarding the request to the fourth node comprises forwarding the request to the fourth node only if the interoperability level of the first node is compatible with the interoperability level of the fourth node.

* * * * *